(12) United States Patent
Yasui et al.

(10) Patent No.: US 11,572,070 B2
(45) Date of Patent: Feb. 7, 2023

(54) DRIVING ASSISTANCE DEVICE AND TRAFFIC SYSTEM

(71) Applicants: Hino Motors, Ltd., Hino (JP); ISUZU MOTORS LIMITED, Shinagawa-ku (JP)

(72) Inventors: Hirofumi Yasui, Hino (JP); Motoaki Hibi, Hino (JP); Takaaki Sekine, Hino (JP); Masahiro Yamaguchi, Hino (JP); Masato Amino, Hino (JP)

(73) Assignees: Hino Motors, Ltd., Hino (JP); ISUZU MOTORS LIMITED, Shinagawa-ku (JP)

( * ) Notice: Subject to any disclaimer, the term of this patent is extended or adjusted under 35 U.S.C. 154(b) by 116 days.

(21) Appl. No.: 17/050,740

(22) PCT Filed: Apr. 23, 2019

(86) PCT No.: PCT/JP2019/017279
§ 371 (c)(1),
(2) Date: Oct. 26, 2020

(87) PCT Pub. No.: WO2019/208583
PCT Pub. Date: Oct. 31, 2019

(65) Prior Publication Data
US 2021/0163006 A1   Jun. 3, 2021

(30) Foreign Application Priority Data

Apr. 27, 2018   (JP) .............................. JP2018-087131

(51) Int. Cl.
*B60W 30/00*   (2006.01)
*B60W 30/18*   (2012.01)
(Continued)

(52) U.S. Cl.
CPC ..... *B60W 30/18109* (2013.01); *G06K 9/6232* (2013.01); *G06V 20/56* (2022.01); *G08G 1/123* (2013.01)

(58) Field of Classification Search
CPC ............ B60W 30/18109; G06V 20/56; G06K 9/6232; G08G 1/123
See application file for complete search history.

(56) References Cited

U.S. PATENT DOCUMENTS

2009/0210150 A1* 8/2009 Shiun-Chih ............ G08G 1/123
 701/532
2015/0294430 A1* 10/2015 Huang ................... G06Q 50/26
 701/2

(Continued)

FOREIGN PATENT DOCUMENTS

CN   103150337 A   6/2013
CN   105723432 A   6/2016
(Continued)

OTHER PUBLICATIONS

International Preliminary Report on Patentability and Written Opinion dated Nov. 5, 2020 in PCT/JP2019/017279 (submitting English language translation only), 7 pages.

(Continued)

*Primary Examiner* — Truc M Do
(74) *Attorney, Agent, or Firm* — Oblon, McClelland, Maier & Neustadt, L.L.P.

(57) ABSTRACT

A driving assistance device includes a guide line detecting unit configured to detect the guide line, a remaining distance acquiring unit configured to acquire a remaining distance to the scheduled stop position, and a braking control unit configured to control deceleration of a vehicle. The guide line detecting unit detects a base-point mark, a curvature of the guide line, and a curvature feature point. The remaining distance acquiring unit acquires the remaining distance on (Continued)

the basis of the position of the base-point mark when the guide line detecting unit has detected the base-point mark, and acquires the remaining distance on the basis of the position of the curvature feature point when the guide line detecting unit has not detect the base-point mark and has detected the curvature feature point.

6 Claims, 5 Drawing Sheets

(51) Int. Cl.
  *G06K 9/62* (2022.01)
  *G08G 1/123* (2006.01)
  *G06V 20/56* (2022.01)

(56) References Cited

U.S. PATENT DOCUMENTS

| | | |
|---|---|---|
| 2016/0033288 A1 | 2/2016 | Ueda |
| 2017/0015316 A1 | 1/2017 | Sekine et al. |

FOREIGN PATENT DOCUMENTS

| | | |
|---|---|---|
| DE | 20 2014 104 780 U1 | 10/2014 |
| FR | 2 752 807 A1 | 3/1998 |
| FR | 2 820 705 A1 | 8/2002 |
| JP | 61-32117 A | 2/1986 |
| JP | H08-26109 A | 1/1996 |
| JP | 8-30329 A | 2/1996 |
| JP | 2003-039979 A | 2/2003 |
| JP | 2006-048333 A | 2/2006 |
| JP | 2007-147521 A | 6/2007 |
| JP | 2008-129867 A | 6/2008 |
| JP | 2008-232630 A | 10/2008 |
| JP | 2009-196487 A | 9/2009 |
| JP | 2009-210510 A | 9/2009 |
| JP | 2015-196403 A | 11/2015 |
| JP | 2015-197794 A | 11/2015 |
| JP | 2017-196967 A | 11/2017 |
| JP | 2017-199112 A | 11/2017 |

OTHER PUBLICATIONS

International Search Report dated Jul. 23, 2019 in PCT/JP2019/017279, 1 page.
Extended European Search Report dated Oct. 26, 2021 in European Patent Application No. 19792544.9, 8 pages.
Office Action dated May 31, 2022, in corresponding Japanese Patent Application No. 2018-087131 (with English Translation), 3 pages.
Combined Chinese Office Action and Search Report dated May 18, 2022, in corresponding Chinese Patent Application No. 201980028425.4 (with English Translation of Category of Cited Documents), 10 pages.

* cited by examiner

DRIVING ASSISTANCE DEVICE AND TRAFFIC SYSTEM

TECHNICAL FIELD

The present invention relates to a driving assistance device and a traffic system that control driving of a vehicle on the basis of a guide line leading to a scheduled stop position.

BACKGROUND ART

In the related art, a driving assistance device described in Patent Literature 1 is known as a driving assistance device that controls driving of a vehicle on the basis of a guide line leading to a scheduled stop position. The driving assistance device described in Patent Literature 1 performs steering control and deceleration control of a fixed-route bus along a guide line and stops the fixed-route bus at a bus stop when the guide line marked on a road surface is detected.

CITATION LIST

Patent Literature

[Patent Literature 1] Japanese Unexamined Patent Publication No. 2017-196967

SUMMARY OF INVENTION

Technical Problem

For example, a means that adds a base-point mark to the guide line is conceivable as a means that acquires a remaining distance to a scheduled stop position of a vehicle. In this means, a distance from the scheduled stop position to the base-point mark is registered in advance. When the base-point mark is detected from a captured image of a camera, the registered distance is acquired as the remaining distance to the scheduled stop position of the vehicle.

When the exposure of the camera varies due to shade, change in solar radiation, or the like or the base-point mark is hidden or dirtied by fallen leaves or the like, the shape of the base-point mark which is recognized by the camera varies. In this case, there is a likelihood that the base-point mark will not be detected and the remaining distance will be unable to be acquired.

Therefore, an objective of the invention is to provide a driving assistance device and a traffic system that can acquire a remaining distance to a scheduled stop position of a vehicle even when a base-point mark cannot be recognized.

Solution to Problem

The applicant of the present application studied the aforementioned objective, paid attention to a guide line extending in a straight line along a lane and then extending to a scheduled stop position while being curved, and obtained the knowledge that a remaining distance to a scheduled stop position of a vehicle can be acquired on the basis of the shape of the guide line.

That is, a driving assistance device according to the invention is a driving assistance device that controls driving of a vehicle on the basis of a guide line leading to a scheduled stop position, the driving assistance device including: a guide line detecting unit configured to detect the guide line from a captured image of a camera; a remaining distance acquiring unit configured to acquire a remaining distance to the scheduled stop position of the vehicle; and a braking control unit configured to control deceleration of the vehicle on the basis of the remaining distance acquired by the remaining distance acquiring unit such that the vehicle stops at the scheduled stop position, wherein the guide line is constituted of a plurality of segments which are separated in an extending direction of the guide line and includes a straight portion including a base-point mark which is provided at a position which is separated a first distance from the scheduled stop position and a curved portion extending from the scheduled stop position side of the straight portion, wherein the guide line detecting unit detects the base-point mark, a curvature of the guide line, and a curvature feature point which is a feature point of the curvature, and wherein the remaining distance acquiring unit acquires the remaining distance on the basis of the position of the base-point mark when the guide line detecting unit has detected the base-point mark, and acquires the remaining distance on the basis of the position of the curvature feature point when the guide line detecting unit has not detected the base-point mark and has detected the curvature feature point.

In the driving assistance device, the remaining distance acquiring unit acquires the remaining distance on the basis of the position of the base-point mark when the guide line detecting unit has detected the base-point mark, and acquires the remaining distance on the basis of the position of the curvature feature point when the guide line detecting unit has not detected the base-point mark and has detected the curvature feature point of the guide line. That is, in the guide line, the curved portion extends from the straight portion. A curvature of the guide line is not detected from the straight portion, but a curvature of the guide line is detected from the curved portion. Accordingly, it is possible to acquire the remaining distance by registering a positional relationship between the position of the curvature feature point and the scheduled stop position in advance. For example, a point at which the curvature is a maximum or a point at which the curvature is detected for the first time (a start point of the curved portion) can be used as the curvature feature point.

The guide line may be formed of a pair of dotted lines which are parallel to each other, and the guide line detecting unit may detect a curvature of a centerline of the pair of dotted lines as the curvature of the guide line. In the driving assistance device, the guide line includes a pair of dotted lines which are parallel to each other, and the curvature of the centerline of the pair of dotted lines may be detected as the curvature of the guide line. Accordingly, it is possible to easily distinguish the guide line from other marking lines and to appropriately detect the curvature of the guide line.

The curvature feature point may be a point at which the curvature is a maximum in the curved portion. In the driving assistance device, a point at which the curvature is a maximum in the curved portion may be used as the curvature feature point. Accordingly, it is possible to easily detect the curvature feature point.

The base-point mark may have a line width greater than a line width of the segments constituting the guide line. In the driving assistance device, the base-point mark may have a line width greater than the line width of the segments constituting the guide line. Accordingly, it is possible to simplify the shape of the base-point mark and to secure easy detection of the base-point mark from a captured image.

The guide line may include a correction base-point mark that is provided at a position which is separated a second distance less than the first distance from the scheduled stop position, and the remaining distance acquiring unit may correct the remaining distance on the basis of a correction factor which is calculated from a relationship between a distance from the base-point mark or the curvature feature point to the correction base-point mark and a summed distance obtained according to rotation of wheels of the vehicle in the meantime when the guide line detecting unit detects the correction base-point mark. In the driving assistance device, when the guide line detecting unit has detected a correction base-point mark, the remaining distance acquiring unit corrects the remaining distance on the basis of the correction factor which is calculated from the relationship between the distance from the base-point mark or the curvature feature point to the correction base-point mark and the summed distance obtained according to the rotation of the wheels of the vehicle in the meantime. Accordingly, it is possible to more accurately stop the vehicle at the scheduled stop position.

The driving assistance device may further include a steering control unit configured to control steering of the vehicle on the basis of the guide line acquired by the guide line detecting unit. In the driving assistance device, the steering control unit controls steering of the vehicle on the basis of the guide line. Accordingly, it is possible to more accurately stop the vehicle at the scheduled stop position.

A traffic system according to the invention is a traffic system including a guide line leading to a scheduled stop position and a driving assistance device configured to stop a vehicle at the scheduled stop position on the basis of the guide line, wherein the guide line includes a straight portion including a base-point mark which is provided at a position which is separated a first distance from the scheduled stop position and a curved portion extending from the scheduled stop position side of the straight portion, wherein the driving assistance device includes: a guide line detecting unit configured to detect the guide line; a remaining distance acquiring unit configured to acquire a remaining distance to the scheduled stop position of the vehicle; and a braking control unit configured to control deceleration of the vehicle on the basis of the remaining distance acquired by the remaining distance acquiring unit such that the vehicle stops at the scheduled stop position, wherein the guide line detecting unit detects the base-point mark, a curvature of the guide line, and a curvature feature point which is a feature point of the curvature, and wherein the remaining distance acquiring unit acquires the remaining distance on the basis of the position of the base-point mark when the guide line detecting unit has detected the base-point mark, and acquires the remaining distance on the basis of the position of the curvature feature point when the guide line detecting unit has not detected the base-point mark and has detected the curvature feature point.

In the traffic system, the remaining distance acquiring unit acquires the remaining distance on the basis of the position of the base-point mark when the guide line detecting unit has detected the base-point mark, and acquires the remaining distance on the basis of the position of the curvature feature point when the guide line detecting unit has not detected the base-point mark and has detected the curvature feature point of the guide line. That is, in the guide line, the curved portion extends from the straight portion. A curvature of the guide line is not detected from the straight portion, but a curvature of the guide line is detected from the curved portion. Accordingly, it is possible to acquire the remaining distance by registering a positional relationship between the position of the curvature feature point and the scheduled stop position in advance. For example, a point at which the curvature is a maximum or a point at which the curvature is detected for the first time (a start point of the curved portion) can be used as the curvature feature point.

Advantageous Effects of Invention

According to the invention, it is possible to acquire a remaining distance to a scheduled stop position of a vehicle even when a base-point mark cannot be recognized.

DESCRIPTION OF EMBODIMENTS

Hereinafter, an exemplary embodiment of the invention will be described in detail with reference to the accompanying drawings. In the following description, the same or similar elements will be referred to by the same reference signs and description thereof will not be repeated.

[Traffic System]

Figure 1:
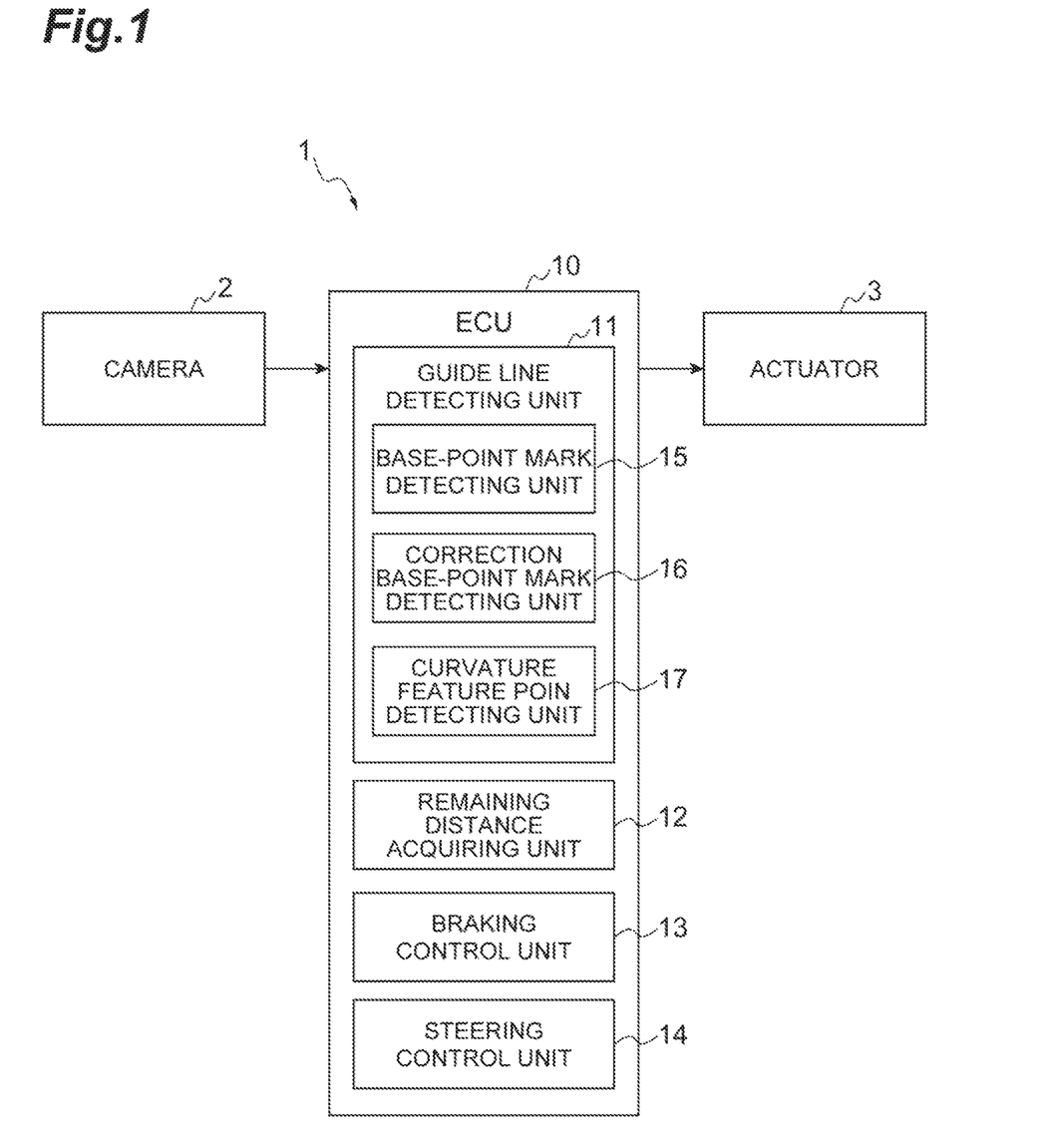
FIG. 1 is a block diagram illustrating a functional configuration of a driving assistance device according to an embodiment.
Figure 2:
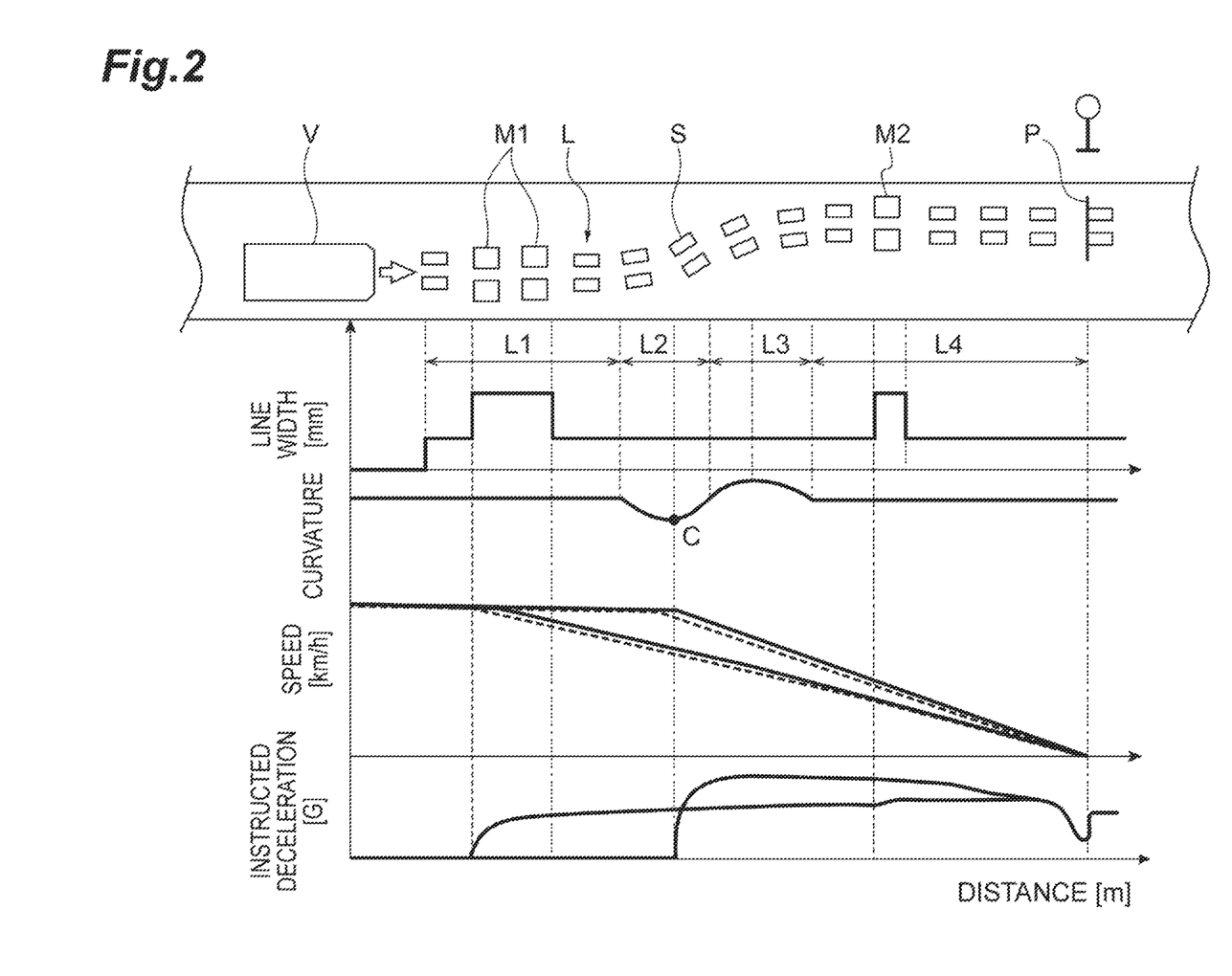
FIG. 2 is a plan view illustrating a traffic system according to the embodiment.

FIG. 1 is a block diagram illustrating a functional configuration of a driving assistance device according to an embodiment. FIG. 2 is a plan view illustrating a traffic system according to the embodiment. As illustrated in FIGS. 1 and 2, a driving assistance device 1 is a device that controls driving of a vehicle V on the basis of a guide line L leading to a scheduled stop position P. The driving assistance device 1 is mounted in a vehicle V of which driving is to be controlled. The vehicle V and the scheduled stop position P are not particularly limited, and it is assumed that the vehicle V is a fixed-route bus and the scheduled stop position P is a bus stop in this embodiment.

[Guide Line]

As illustrated in FIG. 2, a guide line L is a line for guiding a vehicle V traveling in a travel lane to a scheduled stop position P which is provided on a road shoulder (or the vicinity of the road shoulder). The guide line L is marked on a road surface of the travel lane. When there are two or more travel lanes, the guide line L is marked on a road surface of the travel lane which is located closest to the road shoulder. The guide line L is constituted of a plurality of segments S which are separated in an extending direction of the guide line L such that the guide line can be distinguished from other marking lines. More specifically, the guide line L includes a pair of dotted lines which are parallel to each other, and each of the pair of dotted lines is constituted of a plurality of segments S which are separated in the extending direction of the dotted line. A segment S has a rectangular shape which is long in the extending direction in each dotted line.

The guide line L includes a first straight portion L1 that is located at an end opposite to the scheduled stop position P, a first curved portion L2 extending from the first straight portion L1, a second curved portion L3 extending from the first curved portion L2, and a second straight portion L4 extending from the second curved portion L3 and leading to the scheduled stop position P. The first straight portion L1 is formed of a straight line which is parallel to a travel lane. The first curved portion L2 is formed of a curve with a center of curvature on a road shoulder side (for example, a cycloid curve). The second curved portion L3 is formed of a curve with a center of curvature on a side opposite to the road shoulder (for example, a cycloid curve). Accordingly, the first curved portion L2 and the second curved portion L3 have curvatures which are opposite to each other. The second straight portion L4 is formed of a straight line parallel to the road shoulder (the travel lane). That is, the guide line L guides the vehicle V such that the vehicle travels along the travel lane in the first straight portion L1, then guides the vehicle V such that the vehicle approaches the road shoulder in the first curved portion L2 and the second curved portion L3, and then guides the vehicle V such that the vehicle travels along the road shoulder to the scheduled stop position P in the second straight portion L4.

The first straight portion L1 includes a base-point mark M1. The base-point mark M1 is a mark which is provided at a position which is separated a first distance D1 from the scheduled stop position P. The base-point mark M1 is formed by setting one or more of a plurality of segments S constituting the guide line L to a different shape. In FIG. 2, two segments S in the extending direction of the guide line L are formed as the base-point marks M1. That is, in FIG. 2, each of a pair of dotted lines constituting the guide line L includes two base-point marks M1. The shape of the base-point mark M1 is not particularly limited as long as it can be distinguished from the segments S constituting the guide line L, and, for example, may be a shape formed by increasing a line width of the segments S constituting the guide line L. In this case, the line width of the base-point mark M1 may be set to, for example, 1.3 times to 2.0 times the line width of the segments S constituting the guide line L.

The second straight portion L4 includes a correction base-point mark M2. The correction base-point mark M2 is a mark which is provided at a position which is separated a second distance D2 less than the first distance D1 from the scheduled stop position P. The correction base-point mark M2 is formed by setting one or more of a plurality of segments S constituting the guide line L to a different shape. In FIG. 2, one segment S in the extending direction of the guide line L is formed as the correction base-point mark M2. That is, in FIG. 2, each of a pair of dotted lines constituting the guide line L includes one correction base-point mark M2. The shape of the correction base-point mark M2 is not particularly limited as long as it can be distinguished from the segments S constituting the guide line L, and, for example, may be the same shape as the base-point mark M1. The correction base-point mark M2 may be included in the second curved portion L3 instead of the second straight portion L4.

[Driving Assistance Device]

As illustrated in FIG. 1, the driving assistance device 1 includes a camera 2, an actuator 3, and an electronic control unit (ECU) 10.

The camera 2 images the guide line L marked on the road surface in front of the vehicle V by imaging a front view of the vehicle V. The camera 2 is attached to, for example, a rear surface of a front windshield of the vehicle V or a front end thereof to face the road surface. The camera 2 may be a monocular camera or may be a stereo camera. The stereo camera includes, for example, two imaging units provided to reproduce binocular parallax. Imaging information of the stereo camera also includes information in the depth direction. The camera 2 transmits the captured image to the ECU 10.

The actuator 3 is a device that performs travel control of the vehicle V. The actuator 3 includes a brake actuator and a steering actuator. The brake actuator controls a brake system in accordance with a control signal from the ECU 10 and controls a braking force which is applied to wheels of the vehicle V. For example, a hydraulic brake system or an air brake system can be used as the brake system. The steering actuator is, for example, a motor actuator which is provided in a steering shaft. The steering actuator performs steering of the vehicle V by rotating the steering shaft in accordance with a control signal from the ECU 10.

The ECU 10 is an electronic control unit including a central processing unit [CPU], a read only memory [ROM], and a random access memory [RAM]. The ECU 10 performs various types of control by loading a program stored in the ROM to the RAM and causing the CPU to execute the program. The ECU 10 may be constituted of a plurality of electronic control units.

The ECU 10 includes a guide line detecting unit 11, a remaining distance acquiring unit 12, a braking control unit 13, and a steering control unit 14.

The guide line detecting unit 11 detects the guide line L from a captured image of the camera 2. The guide line detecting unit 11 detects the guide line L by detecting the segments S constituting the guide line L from the captured image of the camera 2 using a technique such as pattern matching.

The guide line detecting unit 11 includes a base-point mark detecting unit 15, a correction base-point mark detecting unit 16, and a curvature feature point detecting unit 17.

The base-point mark detecting unit 15 detects a base-point mark M1 from the captured image of the camera 2. When the base-point mark M1 has a shape obtained by increasing the line width of the segments S constituting the guide line L, the base-point mark detecting unit 15 detects the line width of the segments S constituting the guide line L on the basis of an image captured by the camera 2. When a segment with a line width greater than the line width of the segments S constituting the guide line L is detected, the detected segment is detected as the base-point mark M1. When the base-point mark M1 itself is detected, it may be determined that the base-point mark M1 has been detected. When a combined pattern of the base-point mark M1 in the traveling direction of the vehicle V and the normal segments S matches a predetermined pattern, it may be determined that the base-point mark M1 has been detected.

The correction base-point mark detecting unit 16 detects a correction base-point mark M2 on the basis of an image captured by the camera 2. The correction base-point mark detecting unit 16 detects the correction base-point mark M2, for example, using the same technique as used by the base-point mark detecting unit 15.

The curvature feature point detecting unit 17 detects a curvature of the guide line L. The curvature of the guide line L is a curvature of a course represented by the guide line L. The curvature of the guide line L may be a curvature of one of a pair of dotted lines constituting the guide line L, and is preferably a curvature of a centerline of the pair of dotted lines constituting the guide line L. Since the pair of dotted lines constituting the guide line L is formed of a plurality of segments S which are separated in the extending direction of the dotted lines, the guide line detecting unit 11 approximates the segments S of each dotted line to a solid line and calculates the centerline of the approximated solid line as the centerline of the pair of dotted lines constituting the guide line L. Then, the guide line detecting unit 11 calculates the curvature of the calculated centerline.

The curvature feature point detecting unit 17 detects a curvature feature point C which is a feature point of the curvature of the guide line L. The curvature feature point C is a point which can be uniquely identified. In general, since the first curved portion L2 and the second curved portion L3 are expressed by parabolas, there is only one point at which the curvature is a maximum in each curved portion. The positive and negative curvatures of the first curved portion L2 and the second curved portion L3 are opposite. Accordingly, when the positive and negative of the curvature are specified, there is only one point with a maximum curvature. Accordingly, the point with a maximum curvature may be set as the curvature feature point C. In addition, there is only one point at which the curvature is detected for the first time (a boundary between the first straight portion L1 and the first curved portion L2). Accordingly, the point at which the curvature is detected for the first time may be set as the curvature feature point C. In the following description, it is assumed that the point at which the curvature is maximum is the curvature feature point C.

The remaining distance acquiring unit 12 acquires a remaining distance to the scheduled stop position P of the vehicle V. That is, when the guide line detecting unit 11 has detected the base-point mark M1, the remaining distance acquiring unit 12 acquires the remaining distance on the basis of the position of the base-point mark M1. When exposure of the camera 2 varies due to shade, change in solar radiation, or the like or the base-point mark M1 is hidden or dirtied by fallen leaves or the like to change the shape of the base-point mark M1 which is recognized by the camera 2, the guide line detecting unit 11 may not detect the base-point mark M1. In this case, the guide line detecting unit 11 can also detect the curvature of the guide line L by detecting the guide line L. Therefore, when the guide line detecting unit 11 has not detected the base-point mark M1 and has detected the curvature feature point C, the remaining distance acquiring unit 12 acquires the remaining distance on the basis of the position of the curvature feature point C.

Specifically, the remaining distance from the base-point mark M1 to the scheduled stop position P is registered in advance in the memory of the ECU 10 or the like. The registered remaining distance from the base-point mark M1 to the scheduled stop position P is also referred to as a registered distance from the base-point mark M1 to the scheduled stop position P. The remaining distance from the curvature feature point C to the scheduled stop position P is registered in advance in the memory of the ECU 10 or the like. The registered remaining distance from the curvature feature point C to the scheduled stop position P is also referred to as a registered distance from the curvature feature point C to the scheduled stop position P. When the guide line detecting unit 11 has detected the base-point mark M1, the remaining distance acquiring unit 12 reads the registered distance from the base-point mark M1 to the scheduled stop position P from the memory and sets the read registered distance as the remaining distance to the scheduled stop position P of the vehicle V. On the other hand, when the guide line detecting unit 11 has not detected the base-point mark M1 and has detected the curvature feature point C, the remaining distance acquiring unit 12 reads the registered distance from the curvature feature point C to the scheduled stop position P from the memory and sets the read registered distance as the remaining distance to the scheduled stop position P of the vehicle V.

The remaining distance may be a direct distance between the vehicle V and the scheduled stop position P, and is preferably a remaining distance of a course along the guide line L in view of stopping the vehicle V at the scheduled stop position P with high accuracy.

When the guide line detecting unit 11 has detected the correction base-point mark M2, the remaining distance acquiring unit 12 corrects the remaining distance on the basis of the position of the correction base-point mark M2. That is, when the remaining distance acquiring unit 12 has acquired the remaining distance on the basis of the base-point mark M1 or the curvature feature point C, the remaining distance is decreased according to a traveling distance calculated with rotation of the wheels of the vehicle V, but there is a likelihood that the remaining distance will not be accurately calculated due to occurrence of an error based on tire wear or the like. Therefore, the remaining distance from the correction base-point mark M2 to the scheduled stop position P is registered in advance in the memory of the ECU 10 or the like. The registered remaining distance from the correction base-point mark M2 to the scheduled stop position P is also referred to as a registered distance from the correction base-point mark M2 to the scheduled stop position P. After the base-point mark detecting unit 15 or the curvature feature point detecting unit 17 has detected the base-point mark M1 or the curvature feature point C, the remaining distance acquiring unit 12 calculates a correction factor from a relationship between the distance from the base-point mark M1 or the curvature feature point C to the correction base-point mark M2 and a summed distance obtained according to the rotation of the wheels in the meantime. The distance from the base-point mark M1 or the curvature feature point C to the correction base-point mark M2 can be calculated by subtracting the registered distance from the correction base-point mark M2 to the scheduled stop position P from the registered distance from the base-point mark M1 or the curvature feature point C to the scheduled stop position P. When this distance is registered in the memory of the ECU 10 or the like in advance, the distance can be acquired by reading from the memory. When the guide line detecting unit 11 has detected the correction base-point mark M2, the remaining distance acquiring unit 12 reads the registered distance from the correction base-point mark M2 to the scheduled stop position P from the memory and corrects the remaining distance to the scheduled stop position P of the vehicle V using the correction factor on the basis of the read registered distance.

Since it is considered that the vehicle V will have decelerated sufficiently at the position of the correction base-point mark M2, it is considered that the likelihood of the correction base-point mark M2 not being detected is very low.

The braking control unit 13 controls the deceleration of the vehicle V on the basis of the remaining distance acquired by the remaining distance acquiring unit 12 and stops the vehicle V at the scheduled stop position P. That is, the braking control unit 13 activates the actuator 3 on the basis of the remaining distance acquired by the remaining distance acquiring unit 12 to decelerate the vehicle V. Specifically, by activating a brake using the brake actuator, the vehicle V is decelerated. By this deceleration control, the vehicle V is stopped at the scheduled stop position P.

Specifically, as illustrated in FIG. 2, when the guide line detecting unit 11 has detected the base-point mark M1 or the curvature feature point C, the braking control unit 13 instructs the actuator 3 to decelerate such that the vehicle speed of the vehicle V reaches a target vehicle speed corresponding to the remaining distance acquired by the remaining distance acquiring unit 12. The actuator 3 decelerates the vehicle V such that the deceleration instructed from the braking control unit 13 is achieved.

Figure 3:
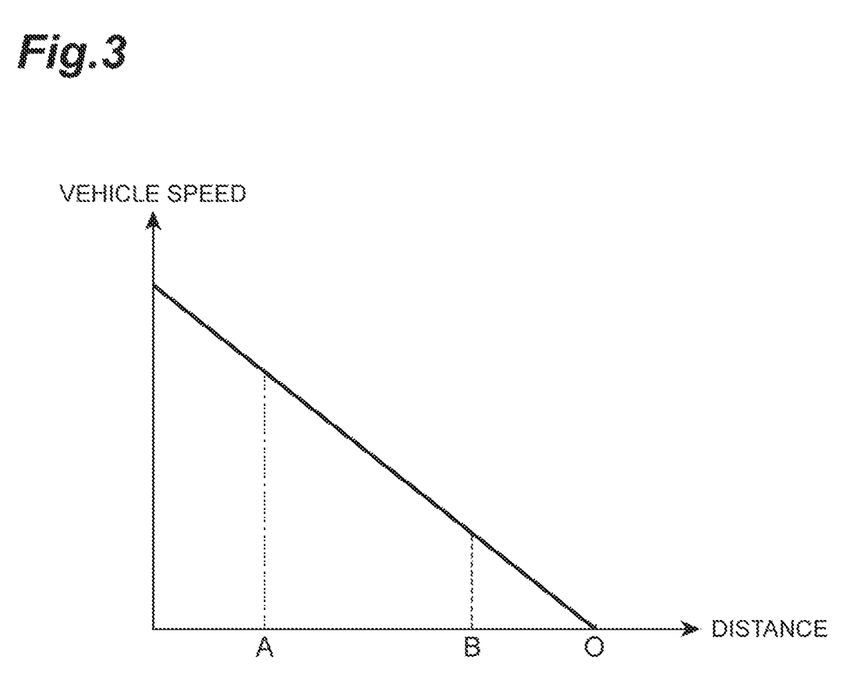
FIG. 3 is a map illustrating a relationship between a distance to a scheduled stop position and a vehicle speed.
Figure 4:
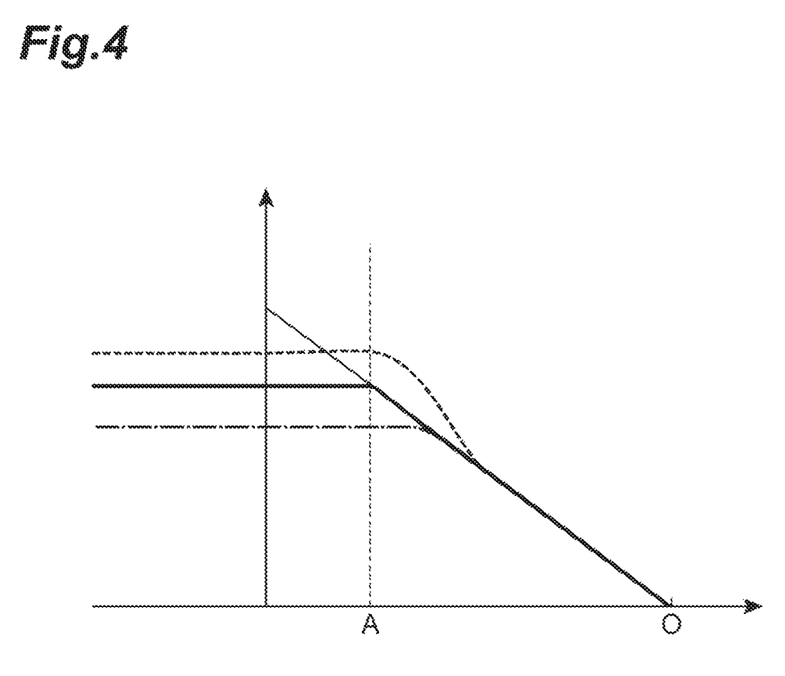
FIG. 4 is a diagram illustrating a relationship with a vehicle speed in the same map illustrated in FIG. 3.

The braking control unit 13 may include a map illustrated in FIG. 3. FIG. 3 is a map illustrating a relationship between the distance to the scheduled stop position P and the vehicle speed. In FIG. 3, A denotes the position of the base-point mark Ml or the curvature feature point C, B denotes the position of the correction base-point mark M2, and O denotes the position of the scheduled stop position P. When the map illustrated in FIG. 3 is provided, the braking control unit 13 reads a vehicle speed corresponding to the remaining distance acquired by the remaining distance acquiring unit 12 or a current remaining distance from the map. Then, the braking control unit 13 decelerates the vehicle V such that current vehicle speed of the vehicle V reaches the vehicle speed read from the map. In this case, as illustrated in FIG. 4, when the current vehicle speed of the vehicle V is higher than the vehicle speed read from the map at the position of the base-point mark M1 or the curvature feature point C, feedback control such as PID control is performed such that the vehicle speed of the vehicle V approaches the vehicle speed read from the map. On the other hand, when the current vehicle speed of the vehicle V is lower than the vehicle speed read from the map at the position of the base-point mark Ml or the curvature feature point C, deceleration control of the vehicle V is performed after the vehicle speed of the vehicle V has reached the vehicle speed read from the map.

The steering control unit 14 controls steering of the vehicle V on the basis of the guide line L acquired by the guide line detecting unit 11.

That is, the steering control unit 14 controls steering of the vehicle V to travel along the guide line L acquired by the guide line detecting unit 11. Specifically, the vehicle V is steered by rotating the steering shaft using the steering actuator. Then, the vehicle V is made to travel to the scheduled stop position P along the guide line L by such steering control.

[Operation]

The operation of the driving assistance device 1 according to this embodiment will be described below.

Figure 5:
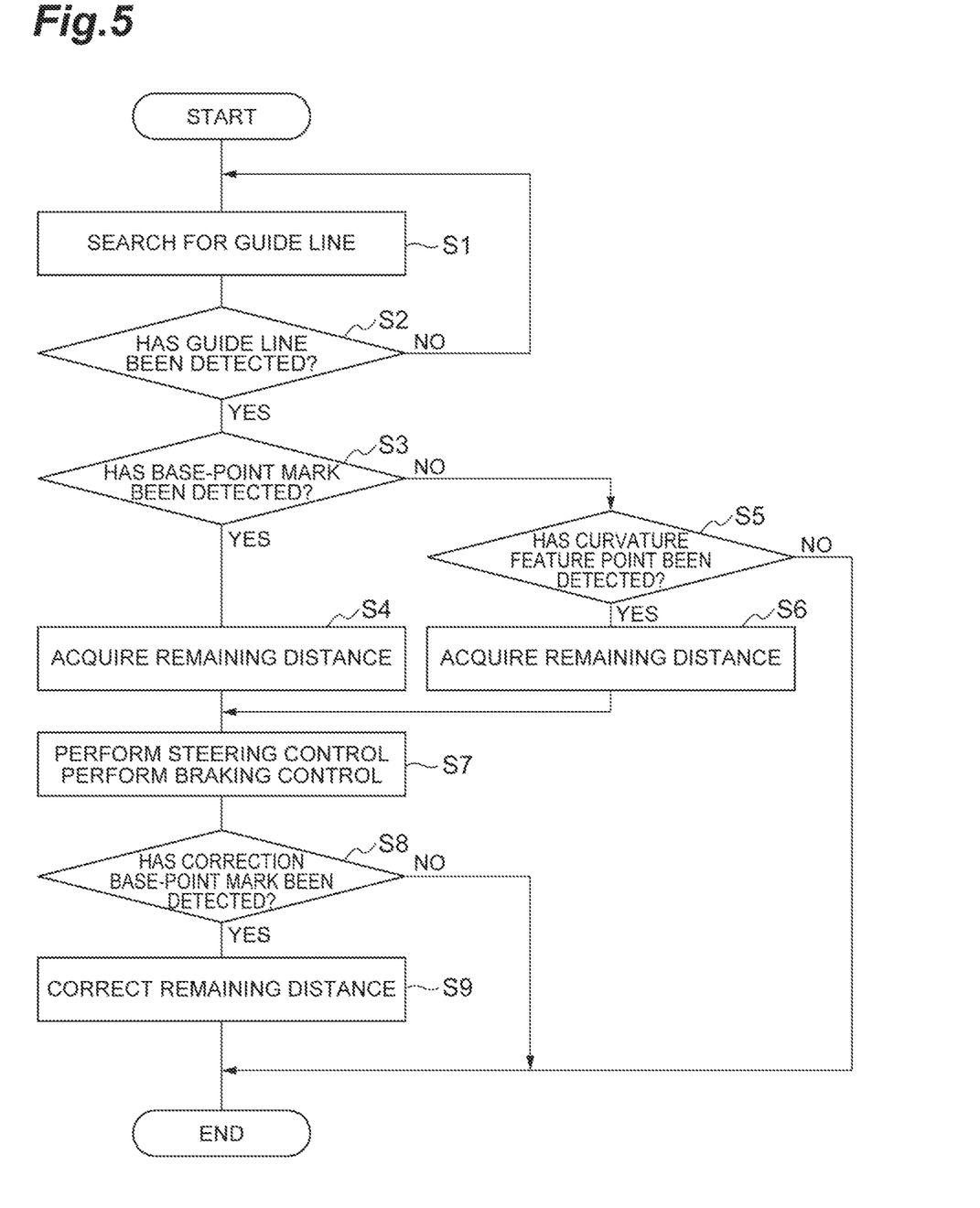
FIG. 5 is a flowchart illustrating an operation of the driving assistance device according to the embodiment.

FIG. 5 is a flowchart illustrating the operation of the driving assistance device according to the embodiment. As illustrated in FIG. 5, the driving assistance device 1 searches for the guide line L (S1) and searches for the base-point mark M1 and the curvature feature point C while detecting the curvature of the guide line L when it is determined that the guide line L has been detected (S2: YES).

When it is determined that the base-point mark M1 has been detected (S3: YES), the driving assistance device 1 acquires the remaining distance to the scheduled stop position P based on the base-point mark M1 (S4). On the other hand, when the base-point mark M1 has not been detected and the curvature feature point C has been detected (S3: NO, S5: YES), the driving assistance device 1 acquires the remaining distance to the scheduled stop position P based on the curvature feature point C (S6). When none of the base-point mark M1 and the curvature feature point C have not been detected, the process flow ends temporarily.

Then, the driving assistance device 1 controls steering of the vehicle V on the basis of the guide line L detected in Steps S1 and S2 and controls deceleration of the vehicle V on the basis of the remaining distance acquired in Step S4 or S6 (S7). Then, the correction base-point mark M2 is searched for.

When it is determined that the correction base-point mark M2 has been detected (S8: YES), the driving assistance device 1 corrects the remaining distance on the basis of the position of the correction base-point mark M2 and the correction factor calculated from the relationship between the distance from the base-point mark M1 or the curvature feature point C to the correction base-point mark M2 and the summed distance obtained according to the rotation of the wheels in the meantime, and continues to perform steering control and deceleration control. When the correction base-point mark M2 has not been detected, steering control and deceleration control are continuously performed without correcting the remaining distance (S9). When the vehicle V stops at the scheduled stop position P, the process flow ends.

As described above, in this embodiment, the remaining distance acquiring unit 12 acquires the remaining distance on the basis of the position of the base-point mark M1 when the guide line detecting unit 11 has detected the base-point mark M1, and acquires the remaining distance on the basis of the position of the curvature feature point C when the guide line detecting unit 11 has not detected the base-point mark M1 and has detected the curvature feature point C of the guide line L. That is, in the guide line L, the first curved portion L2 and the second curved portion L3 extend from the first straight portion L1. The curvature of the guide line L is not detected from the first straight portion L1, but the curvature of the guide line L is detected from the first curved portion L2 and the second curved portion L3. Accordingly, it is possible to acquire the remaining distance by registering a positional relationship between the position of the curvature feature point C and the scheduled stop position P in advance.

The guide line L is formed of a pair of dotted lines which are parallel to each other, and a curvature of a centerline of the pair of dotted lines is detected as the curvature of the guide line L. Accordingly, it is possible to easily distinguish the guide line L from other marking lines and to appropriately detect the curvature of the guide line L.

A point at which the curvature is a maximum in the first curved portion L2 or the second curved portion L3 is used as the curvature feature point C. Accordingly, it is possible to easily detect the curvature feature point C.

The base-point mark M1 has a line width greater than a line width of the segments constituting the guide line L. Accordingly, it is possible to simplify the shape of the base-point mark M1 and to secure easy detection of the base-point mark M1 from a captured image.

The remaining distance acquiring unit 12 corrects the remaining distance on the basis of the correction factor which is calculated from the relationship between the registered distance from the base-point mark M1 and the correction base-point mark M2 and the summed distance obtained according to the rotation of the wheels of the vehicle in the meantime when the guide line detecting unit 11 detects the correction base-point mark M2. Accordingly, it is possible to more accurately stop the vehicle V at the scheduled stop position P.

The steering control unit 14 controls steering of the vehicle on the basis of the guide line L. Accordingly, it is possible to more accurately stop the vehicle V at the scheduled stop position P.

While an exemplary embodiment of the invention has been described above, the invention is not limited to the embodiment and may be modified without departing from the gist described in the appended claims or may be applied to another configuration.

For example, it is assumed that the guide line includes the first straight portion, the first curved portion extending from the first straight portion, the second curved portion extending from the first curved portion, and the second straight portion extending from the second curved portion in this embodiment, but the guide line may have a combination of any shapes as long as the guide line includes at least a straight portion and a curved portion extending from the straight portion, the straight portion includes a base-point mark, and the curved portion includes a curvature feature point. The guide line does not have to end at the scheduled stop position and may extend over the scheduled stop position.

REFERENCE SIGNS LIST

1 . . . Driving assistance device
2 . . . Camera
3 . . . Actuator
10 . . . ECU
11 . . . Guide line detecting unit
12 . . . Remaining distance acquiring unit
13 . . . Braking control unit
14 . . . Steering control unit
15 . . . Base-point mark detecting unit
16 . . . Correction base-point mark detecting unit
17 . . . Curvature feature point detecting unit
C . . . Curvature feature point
L . . . Guide line
S . . . Segment
L1 . . . First straight portion
L2 . . . First curved portion
L3 . . . Second curved portion
L4 . . . Second straight portion
M1 . . . Base-point mark
M2 . . . Correction base-point mark
P . . . Scheduled stop position
V . . . Vehicle

The invention claimed is:

1. A driving assistance device that controls driving of a vehicle on the basis of a guide line leading to a scheduled stop position, the driving assistance device comprising:
a guide line detecting unit configured to detect the guide line from a captured image of a camera;
a remaining distance acquiring unit configured to acquire a remaining distance to the scheduled stop position of the vehicle; and
a braking control unit configured to control deceleration of the vehicle on the basis of the remaining distance acquired by the remaining distance acquiring unit such that the vehicle stops at the scheduled stop position,
wherein the guide line is constituted of a plurality of segments which are separated in an extending direction of the guide line and includes a straight portion including a base-point mark which is provided at a position which is separated a first distance from the scheduled stop position and a curved portion extending from the scheduled stop position side of the straight portion,
wherein the guide line is formed of a pair of dotted lines which are parallel to each other,
wherein the base-point mark has a line width greater than a line width of the segments constituting the guide line,
wherein the guide line detecting unit detects the base-point mark, a curvature of the guide line, and a curvature feature point which is a feature point of the curvature, and
wherein the remaining distance acquiring unit acquires the remaining distance on the basis of the position of the base-point mark when the guide line detecting unit has detected the base-point mark, and acquires the remaining distance on the basis of a position of the curvature feature point when the guide line detecting unit has not detected the base-point mark and has detected the curvature feature point.

2. The driving assistance device according to claim 1, wherein the guide line detecting unit detects a curvature of a centerline of the pair of dotted lines as the curvature of the guide line.

3. The driving assistance device according to claim 1, wherein the curvature feature point is a point at which the curvature is a maximum in the curved portion.

4. The driving assistance device according to claim 1, wherein the guide line includes a correction base-point mark that is provided at a position which is separated a second distance less than the first distance from the scheduled stop position, and
wherein the remaining distance acquiring unit corrects the remaining distance on the basis of a correction factor which is calculated from a relationship between a distance from the base-point mark or the curvature feature point to the correction base-point mark and a summed distance obtained according to rotation of wheels of the vehicle in the meantime when the guide line detecting unit detects the correction base-point mark.

5. The driving assistance device according to claim 1, further comprising a steering control unit configured to control steering of the vehicle on the basis of the guide line acquired by the guide line detecting unit.

6. A traffic system comprising:
a guide line leading to a scheduled stop position; and
a driving assistance device configured to stop a vehicle at the scheduled stop position on the basis of the guide line,
wherein the guide line includes a plurality of segments which are separated in an extending direction of the guide line and a straight portion including a base-point mark which is provided at a position which is separated a first distance from the scheduled stop position and a curved portion extending from the scheduled stop position side of the straight portion,
wherein the guide line is formed of a pair of dotted lines which are parallel to each other,
wherein the base-point mark has a line width greater than a line width of the segments constituting the guide line,
wherein the driving assistance device includes:
a guide line detecting unit configured to detect the guide line;
a remaining distance acquiring unit configured to acquire a remaining distance to the scheduled stop position of the vehicle; and
a braking control unit configured to control deceleration of the vehicle on the basis of the remaining distance acquired by the remaining distance acquiring unit such that the vehicle stops at the scheduled stop position,
wherein the guide line detecting unit detects the base-point mark, a curvature of the guide line, and a curvature feature point which is a feature point of the curvature, and
wherein the remaining distance acquiring unit acquires the remaining distance on the basis of the position of the base-point mark when the guide line detecting unit has detected the base-point mark, and acquires the remaining distance on the basis of a position of the curvature feature point when the guide line detecting unit has not detected the base-point mark and has detected the curvature feature point.

* * * * *